May 7, 1940.  W. D. PHELPS  2,200,097
SIGNAL TRANSLATING APPARATUS
Filed Jan. 14, 1937
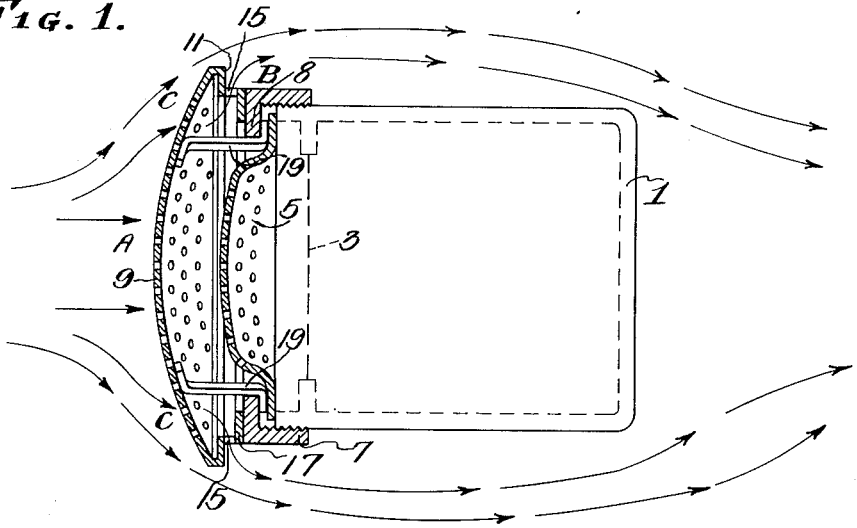
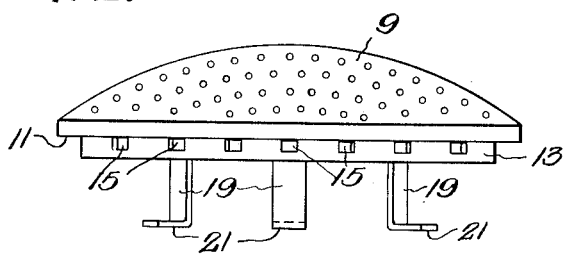
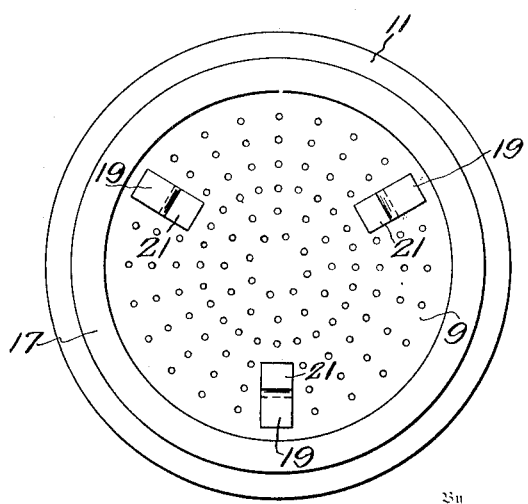
Inventor
William D. Phelps
By
Attorney Patented May 7, 1940

2,200,097

UNITED STATES PATENT OFFICE 2,200,097

SIGNAL TRANSLATING APPARATUS

William D. Phelps, Merchantville, N. J., assignor to Radio Corporation of America, a corporation of Delaware Application January 14, 1937, Serial No. 120,483

1 Claim. (Cl. 179—188)

This invention relates to signal translating apparatus, and more particularly to microphones.

It is well known that there are many disturbing influences which cause excitation of microphones and result in extraneous noises being introduced. This eventually results in the reproduction of sounds which were not intended originally to be picked up by the microphone. Among the sources which cause these extraneous noises is the wind, particularly where the microphone is used out-of-doors.

The primary object of my invention is to provide an improved microphone structure in which wind excitation is reduced to a minimum.

More particularly, it is an object of my invention to provide an improved wind screen for microphones which will effectively utilize the wind pressure gradient over the microphone so that the wind will affect the microphone, if at all, only a very little.

Another object of my invention is to provide a microphone wind screen as aforesaid which is very simple in construction, which may be applied to the microphone with great facility, and which is inexpensive of manufacture.

In accordance with my invention, I provide a second, or auxiliary, wind screen for the microphone casing designed to take advantage of what is known as the Bernoulli principle relating to fluids, the wind screen being so constructed as to create a path for the wind which will tend to form a slight vacuum in front of the vibratile member, or the diaphragm, whereby the wind will be directed away from said member and the wind pressure at the diaphragm will be greatly reduced. Thus, the wind will have little or no effect upon the microphone.

The novel features that I consider characteristic of my invention are set forth with particularity in the appended claim. The invention itself, however, both as to its organization and method of operation, together with additional objects and advantages thereof, will best be understood from the following description of the specific embodiment thereof, when read in connection with the accompanying drawing in which Figure 1 is a sectional view of my improved screen as applied to a microphone casing, Figure 2 is a side elevation of my improved screen, and Figure 3 is a bottom plan view thereof.

Referring more specifically to the drawing, wherein similar reference characters designate corresponding parts throughout, I have shown, in Fig. 1, a microphone casing I within which is mounted a vibratile member 3 of any suitable type. The member 3 may be of the type responsive either to the pressure component or to the pressure gradient component of the sound waves being picked up by the microphone, or it may be of any other suitable type. For ordinary protection of the member 3, a perforated wind screen 5 is usually mounted against the head of the casing I and held in place by means of an annular screw cap or the like 7, the inwardly extending annular rim or flange 8 of which bears against the peripheral portion of the screen 5.

The improved wind screen, according to my present invention, may be employed either in place of the wind screen 5 or in addition thereto. As shown in the drawing, I employ my improved wind screen as an additional screen 9 which is also perforated and is preferably formed as the segment of a sphere, the base of the segment having a diameter appreciably larger than that of the cap 7 to provide an annular flange portion 11 beyond the cap 7. The screen 9 has a reduced diameter adjacent the flange 11 to provide a peripheral portion 13 of substantially the same diameter as the cap 7 and the casing I and in which are formed a plurality of circumferentially spaced apertures 15, the peripheral portion 13 terminating in an inwardly extending annular flange 17 which abuts against the rim 8. Soldered or otherwise suitably secured to the inner surface of the screen 9 are a plurality of resilient legs 19, each of which has its free end offset to provide a tab 21 adapted to fit under the annular rim 8 and against the wind screen 5. In mounting the screen 9 on the microphone casing, the screw cap 7 is first loosened and the tabs 21 are sprung in beneath the annular rim 8, after which the cap 7 is tightened down. The distance between the flange 17 and the tabs 21 should be somewhat less than the thickness of the flange 8 so that, when the cap 7 is tightened down, the flange 17 will rest snugly against the rim 8.

According to Bernoulli's principle, the following relation holds for a fluid in a steady state of motion, neglecting viscosity:

$$\frac{q_1^2}{2}+\frac{p_1}{\rho}+v_1=\frac{q_2^2}{2}+\frac{p_2}{\rho}+v_2 \qquad (1)$$

where $q_1$ is the viscosity of the fluid at one point, $q_2$ is the velocity of the fluid at another point, $p_1$ is the pressure of the fluid at the first named point, $p_2$ is the pressure of the fluid at the second named point, $v_1$ is the potential energy of the fluid at the first named point, $v_2$ is the potential energy of the fluid at the second named point, and $\rho$ is the density of the fluid.

It can also be shown that the above equation is also true where the pressure and velocity vary with time for the practical case where, as in the case under consideration, the velocity, $q$, at a distance from the microphone, is expressed by the equation $$q = q_0 + q^1(t) \qquad (2)$$

and $q_0$ is large compared with $q^1(t)$, $q_0$ being the steady component of the velocity, and $q^1(t)$ being the component of the velocity variable with time.

In Fig. 1, the arrows indicate the general direction of flow of air resulting from the wind. If the first named point referred to above in connection with Equation 1 be taken immediately in front of the screen 9, designated A in the drawing, and the second named point referred to above be taken adjacent the vents 15, designated B in the drawing, the potential energy of the air will be substantially the same at each point, and Equation 1 will become $$\frac{q_1^2}{2} + \frac{p_1}{\rho} = \frac{q_2^2}{2} + \frac{p_2}{\rho} \qquad (3)$$

Since $q_2$ (at point B) is greater than $q_1$ (at point A), it follows from Equation 3 that $p_1$ is greater than $p_2$. In other words, there is a drop in pressure from the point A to the point B. By providing the apertures 15 in the peripheral portion 13, advantage may be taken of this difference in pressure to produce a relative suction tending to create a vacuum within the space between the caps 5 and 9, whereby the wind pressure against the vibratile member 3 is greatly reduced, the apertures 15 acting as vents through which the air may be drawn or sucked out in the manner shown by the arrows C, and the annular flange 11 enhancing the pressure gradient. By proper choice of the size and shape of the screen 9 and the microphone and proper spacing of the venting apertures 15, the optimum use of Bernoulli's principle may be had.

Although I have described but one specific embodiment of my invention, I am fully aware that many other modifications thereof are possible. For example, the front surface of the screen 9 need not necessarily be a spherical surface, but may be formed of any other suitable shape. Also, the flange 11 may be entirely dispensed with and the screen 9 formed on the diameter of the peripheral portion 13. Many other changes will, no doubt, readily suggest themselves to those skilled in the art, and I therefore desire that my invention shall not be limited except insofar as is made necessary by the prior art and by the spirit of the appended claim.

I claim as my invention:

In a microphone, the combination of a casing, a vibratile member supported therein and arranged to be actuated by sound waves impinging thereon, and a pair of perforated wind screens carried by said casing in front of said vibratile member, said wind screens being spaced from each other, the innermost of said screens being of relatively small diameter and the outer one of said screens being formed substantially as a segment of a sphere and having a maximum diameter greater than that of said casing, said outer screen being provided with an annular peripheral portion having a diameter substantially equal to that of said casing and being formed with a plurality of venting apertures.

WILLIAM D. PHELPS.

CERTIFICATE OF CORRECTION.

Patent No. 2,200,097. May 7, 1940.

WILLIAM D. PHELPS.

It is hereby certified that error appears in the printed specification of the above numbered patent requiring correction as follows: Page 1, second column, line 50, for the word "viscosity" read --velocity--; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.